(12) United States Patent
Bhatia et al.

(10) Patent No.: US 11,675,515 B2
(45) Date of Patent: Jun. 13, 2023

(54) INTELLIGENT PARTITIONING ENGINE FOR CLUSTER COMPUTING

(71) Applicant: Bank of America Corporation, Charlotte, NC (US)

(72) Inventors: Sheetal Bhatia, Maharashtra (IN); Sandeep Kumar Chauhan, Hyderabad (IN); Anuranjan Kishore, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/177,717

(22) Filed: Feb. 17, 2021

(65) Prior Publication Data

US 2022/0261254 A1 Aug. 18, 2022

(51) Int. Cl.
  *G06F 3/06* (2006.01)
  *G06F 9/48* (2006.01)
  *G06F 9/50* (2006.01)
  *G06N 20/00* (2019.01)
  *G06F 12/02* (2006.01)

(52) U.S. Cl.
  CPC ......... *G06F 3/0644* (2013.01); *G06F 3/0604* (2013.01); *G06F 3/067* (2013.01); *G06F 9/4881* (2013.01); *G06F 9/5044* (2013.01); *G06N 20/00* (2019.01); *G06F 9/5061* (2013.01); *G06F 12/0253* (2013.01)

(58) Field of Classification Search
  CPC ...... G06F 3/0644; G06F 3/0604; G06F 3/067; G06F 9/4881; G06F 9/5044; G06F 9/5061; G06N 20/00
  See application file for complete search history.

(56) References Cited

U.S. PATENT DOCUMENTS

| | | | |
|---|---|---|---|
| 4,920,487 A * | 4/1990 | Baffes | G06F 9/5016 711/147 |
| 7,958,509 B2 * | 6/2011 | Aridor | G06F 9/5011 718/100 |
| 9,858,124 B1 * | 1/2018 | Ghare | G06F 9/5083 |
| 10,296,380 B1 * | 5/2019 | Garcia | G06F 9/4887 |
| 10,372,574 B1 | 8/2019 | Acheson et al. | |
| 2013/0152057 A1 * | 6/2013 | Ke | G06F 8/453 717/132 |

(Continued)

*Primary Examiner* — Ryan Bertram
(74) *Attorney, Agent, or Firm* — Banner & Witcoff, Ltd.

(57) ABSTRACT

An intelligent data partitioning engine processes instructions to monitor an input queue of a cluster computing framework processing on a distributed computing system. The intelligent data partitioning engine calculates data requirements for processing of one or more program files in the input queue and determines, based on a block size and available processing resources of a plurality of nodes of the distributed computing system, a number of data partitions. Based on the data partitions, the intelligent data partitioning engine triggers execution of the one or more program files by the cluster computing framework, where the cluster computing framework is configured based on the block size and the number of data partitions and updates the data requirements for processing of the one or more program files based on feedback from the cluster computing framework corresponding to one or more previous processing runs of the one or more program files.

15 Claims, 7 Drawing Sheets

(56) References Cited

U.S. PATENT DOCUMENTS

| | | | |
|---|---|---|---|
| 2014/0156719 A1* | 6/2014 | Leggette | G06F 3/067 |
| | | | 709/201 |
| 2018/0239808 A1 | 8/2018 | Koochakzadeh et al. | |
| 2018/0300176 A1* | 10/2018 | Chen | G06F 9/4887 |
| 2019/0156243 A1* | 5/2019 | Li | G06N 20/00 |
| 2019/0272201 A1* | 9/2019 | Aritsuka | G06F 9/5094 |
| 2019/0370268 A1 | 12/2019 | Koochakzadeh et al. | |
| 2020/0311573 A1* | 10/2020 | Desai | G06N 20/10 |
| 2021/0286650 A1* | 9/2021 | Henry | G06F 9/5011 |
| 2022/0050845 A1* | 2/2022 | Rastogi | G06F 16/285 |

\* cited by examiner

INTELLIGENT PARTITIONING ENGINE FOR CLUSTER COMPUTING

BACKGROUND

Aspects of the disclosure relate to managing resources of a cluster computing system. One or more aspects of the disclosure relate to an intelligent partitioning engine capable of intelligently managing and partitioning data resources for cluster computing system.

For many organizations, such as business organizations, governmental organizations, educational organizations and the like, networked computing resources represent an important, but finite, resource that allows the enterprise to provide products and services to their employees and customers. For example, the enterprise may utilize the computing resources in software development, running applications and computer-based services, performing large-scale data analytics, and the like. To maximize computing efficiency (e.g., processing efficiency, memory usage efficiency, network bandwidth efficiency, and the like), the enterprise may utilize a cluster computing framework such as when managing manage data intensive and/or operation intensive operations. For example, an enterprise may configure a plurality of workstations (e.g., nodes) within a cluster computing framework to provide distributed services, such as storage services, processing services, and the like.

While cluster computing frameworks may provide a way to program computing clusters with implicit data parallelism and fault tolerance, however, runtime configurations are often reliant upon experience of a user to provide an effective processing environment. Further, experienced users may not always fully understand the system requirements for each program to be executed in the queue, thus causing inefficient memory allocation and/or inefficient processor time management and use. As such, a need has been recognized for a computing system capable of intelligently managing and partitioning data resources based on dynamically allocated cluster computing and adapting the data partitions in future runs based on system feedback.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity.

In some cases, an intelligent data partitioning engine processes instructions to monitor an input queue of a cluster computing framework processing on a distributed computing system. The intelligent data partitioning engine calculates data requirements for processing of one or more program files in the input queue and determines, based on a block size and available processing resources of a plurality of nodes of the distributed computing system, a number of data partitions. Based on the data partitions, the intelligent data partitioning engine triggers execution of the one or more program files by the cluster computing framework, where the cluster computing framework is configured based on the block size and the number of data partitions and updates the data requirements for processing of the one or more program files based on feedback from the cluster computing framework corresponding to one or more previous processing runs of the one or more program files.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
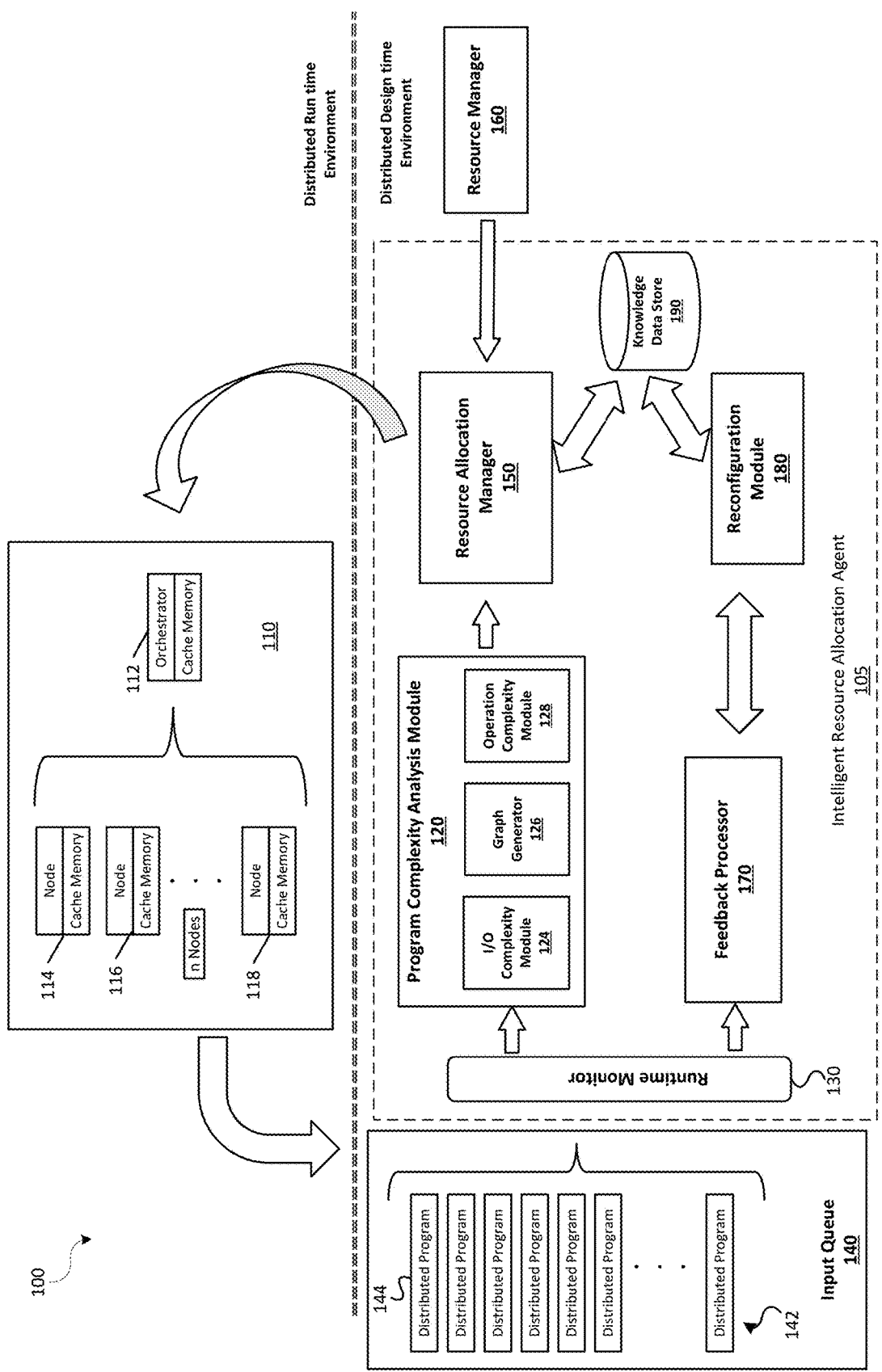
FIG. 1 shows an illustrative cluster computing environment for implementing an intelligent resource allocation agent service in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

In some cases, a cluster computing framework may be provided as a single source system from a particular cluster computing provider or as an open-source cluster computing framework. Often these cluster computing frameworks provide a processing engine to perform extract, transfer and load (ETL) functions, analytics, machine learning, and or graph processing on large volumes of data (e.g., batch processing, stream processing, and the like) based on one or more high-level application programming interfaces (APIs) that support one or more programming languages, such as Scala, Python, Java, R, SQL, and the like. Cluster computing frameworks provide users a library of operators for use in application development, such as libraries for batch analytics, dataset queries, real-time analysis, machine learning, graph processing, and the like.

Often, the cluster computing framework may include a cluster manager and a distributed data storage system that may support different data structures, such as a resilient distributed data set, that may be a set of data items distributed over the machines comprising the cluster computing framework. These resilient distributed data sets may be used as a working data set for distributed programs. In some cases, the cluster computing framework may use shared memory (e.g., the resilient distributed dataset) to dispatch and/or schedule tasks and/or to handle at least a portion of input/output (I/O) functionalities.

Some cluster computing frameworks may provide a way to program computing clusters with implicit data parallelism and fault tolerance. Further, such cluster computing frameworks may rely upon programmer experience to provide to perform system configuration of computing resources (e.g., processing power, available memory, communication efficiency, and the like) when processing programs in an input queue. However, even experienced programmers and system administrators often fail to allocate system resources properly. Often, these configurations may provide an effective run time processing environment with system resources being over-allocated, so that overall system effectiveness and throughput is reduced. In some cases, the system resources may be under-allocated or run with an improper execution policy (e.g., First Come-First Served, Long Job First, and the like) so that programs may execute slowly and/or high priority jobs may be interrupted or not started due to system resources being taken by loser priority programs. Further, many of the distributed computing frameworks may provide one or more ways to split and/or partition the data in such a way to achieve a maximum of parallelism. However, when improvements are made to allocations of cluster computing resources, a need was recognized to utilize flexibility in the different frameworks to design partitioning based on program logic and data understanding. For example, an intelligent data partitioning agent may be trained for generating data partitioning strategies that may maximize parallel processing of data and/or to ensure central processing unit (CPU) processing utilization is, at a minimum, at least 70%. In some cases, the intelligent data partitioning agent may analyze and/or resolve skews identified in data values.

In addition to the intelligent data partitioning agent managing dynamic resource allocation, such as based on a derived complexity, the intelligent data partitioning agent (e.g. an intelligent partitioning engine) may partition the data to ensure that task execution is balanced. In some cases, a feedback processor may analyze data after program execution to identify skews and/or perform garbage collection tuning as identified. In some cases, a skew resolver may analyze data distribution of key values and/or may apply techniques to uniformly distribute the data. In some cases, the intelligent data partitioning agent or engine may include a data split or partition strategy calculator. The data split or partitioning strategy calculator may calculate a number of partitions and/or a size of each partition for which data is to be split, such as to ensure maximum parallelism. In some cases, factors influencing data partitioning calculations may be an availability of a portion of a framework infrastructure, a time required to complete each task, and/or an amount of data that is spilled (e.g., stored) to disk due to non-availability of memory in random access memory (RAM) during processing. A goal for the intelligent data partitioning agent or engine may be to ensure that, when a program is producing output data, enough available memory should be available within each partition such as for a program data write operation for all of the produced output data. In some cases, a skew resolver may process instructions to analyze data distribution information and may apply one or more techniques to uniformly distribute the data values. A feedback processor may capture, analyze and/or evaluate data spilled to a hard disk or other alternate memory storage device, due to unavailability of memory for one or more tasks associated with one or more executors. The feedback processor may also process timing information that is required by each task in each of the executors to ensure that the process timing is at least a minimum value (e.g., at least 100 ms) to justify context switching. The feedback processor may also analyze various feedback information and/or may determine an overall balance in program execution and may automatically correct any imbalances identified, such as by providing inputs for a partitioning strategy by an intelligent data partitioning engine.

In some cases, cloud computing resources may be determined by an intelligent resource allocation agent, which may calculate a complexity for a number of programs and/or jobs in an input queue, based on type of operations being performed and/or a type of data access (e.g., local memory access, data storage device (e.g., a disk drive, a tape drive, a solid state memory device, and the like) access, network access, and the like) used by the operations. In some cases, the intelligent resource allocation agent may operate cooperatively with an intelligent data partitioning engine to ensure the computing resources and data resources are allocated efficiently.

The intelligent resource allocation agent may also determine an execution policy such as First come-First Served (FCFS), Long Job First (LJF), Highest Complexity Job First (HCJF), and the like, for a list of analyzed programs in the queue. In some cases, the intelligent resource allocation agent may execute in a semi-supervised fashion using one or more machine learning algorithms to continually improve program complexity calculations, memory-use complexity calculations, and considering available resources, such as processor usage, I/O processing queues, node usage, processor time management use, latency parameters, and/or other system usage parameters. In some cases, the intelligent data partitioning engine may execute in a semi-supervised fashion using one or more machine learning algorithms to continually improve data allocation, resolve data skew, perform and improve garbage collection activities, and the like.

In some cases, the intelligent resource allocation agent may include one or more computing devices processing instructions, that when executed by a processor, cause the intelligent resource allocation agent to provide a runtime monitor, a program complexity analysis module, a resource allocation manager, a feedback processor, and a reconfiguration module. The intelligent resource allocation agent may also include one or more data stores, such as a knowledge data store. The program complexity analysis module may calculate a complexity of each job or program in an input queue and may determine an operational complexity and/or an I/O complexity such as by using a complexity graph generator. The resource allocation manager may perform an intelligent allocation of cluster computing resources based on infrastructure information received from a resource manager of the cluster computing framework along with I/O complexity analysis and program complexity analysis information from the program complexity analysis module. The feedback processor may monitor execution of the programs by the cluster computing environment and/or analyze data logs provided by the cluster computing environment and store feedback information in a knowledge data store for use by one or more machine learning algorithms to improve complexity calculations by the program complexity analysis module and/or resource allocation by the resource allocation manager.

In a simplified example, the intelligent resource allocation agent may identify a number of programs in a queue ready for processing. The program complexity analysis module may analyze commands in each of the programs to determine a complexity of the program execution and/or the complexity of I/O usage. Based on this information, and a knowledge base of previous cluster computing operations, the resource allocation manager may then analyze the program complexity and I/O complexity of the programs, an amount of available resources of the cluster computing environment (e.g., available nodes, available memory, and the like), and efficiency variables (e.g., latency parameters, network usage parameters, and the like) to optimize the execution of the programs in the queue. For example, the resource allocation manager may allocate a number of nodes (e.g., a master node and one or more worker nodes), allocate memory and/or processors to the nodes to execute the programs, and the like. A feedback monitor may collect data associated with the processing of the programs by the cluster computing environment, such as data logs, and a feedback processor may analyze the cluster computing feedback, along with the program complexity calculations and other system parameters, such as by using a machine learning algorithm, to identify improvements that may be made to the program complexity calculations, the I/O complexity calculations, a program execution policy (e.g., FCFS, LJF, HCJF, and the like), along with other parameters. The feedback processor may then update the information stored in the knowledge database for use in future program complexity calculations, I/O complexity calculations, and resource allocation of the cluster computing system.

FIG. 1 shows an illustrative cluster computing environment 100 for implementing an intelligent resource allocation agent service to intelligently and efficiently allocate cloud computing resources, as discussed in co-pending U.S. patent application Ser. No. 16/569,223 entitled "Resource Allocation Based on Code Complexity", which is included herein in its entirety. The illustrative cluster computing environment 100 may include a plurality of computing devices in a cluster computing system 110 (e.g., workstations, servers, and the like) configured in a distributed runtime environment, including a plurality of nodes (e.g., workers, executors, and the like), such as node 114, node 116, and node 118, and an orchestrator 112 (e.g., main node). Additionally, the illustrative cluster computing environment 100 also includes a distributed design time environment including an intelligent resource management agent 105 communicatively coupled to an input queue 140 and a resource manager for the cluster computing framework. The illustrative intelligent resource management agent 105 includes a runtime monitor 130, a program complexity analysis module 120, a resource allocation manager 150, a feedback processor 170, a reconfiguration module 180, and a knowledge data store 190. Further, the illustrative program complexity analysis module 120 includes an I/O complexity module 124, a graph generator 126, and an operation complexity module.

In some cases, the runtime monitor 130 of the intelligent resource management agent 105 may monitor inputs to the cluster computing system 110 (e.g., the input queue 140) and outputs of the cluster computing system such as, for example, execution logs providing information regarding program execution efficiency and computing resource status. For example, the runtime monitor 130 may monitor the input queue 140 to determine whether a batch of programs have been queued for processing. In some cases, the runtime monitor 130 may identify that a batch of programs 142 has been loaded in the input queue and then trigger the program complexity analysis module 120 to parse each program 142 of one or more of programs 144 of the batch. In some cases, programs may be loaded in the input que, as individual programs or batches of programs, until a threshold number of programs has been reached before triggering the program complexity analysis module 120 to parse each program 142 of one or more of programs 144 in the input queue. Additionally, the runtime monitor 130 may monitor execution logs and other execution status information output by the cluster computing system 110 following completed execution of the programs in a processed batch, as discussed in more detail below.

The program complexity analysis module 120 may analyze the one or more programs 142 entered in the input queue to identify a complexity of operations performed in each program 144 and a complexity of I/O usage required by the operations in each program 144. In some cases, the I/O complexity module 124 may analyze the I/O complexity of each program 144 and the operation complexity module 128 may analyze the complexity of the operations of each program 144. The graph generator 126 may process complexity information determined by each of the I/O complexity module 124 and the operation complexity module 128 to output the complexity information in a format readable by a human, in a format readable by the resource allocation manager 150 or a combination of formats. In some cases, the program complexity analysis module 120 may store complexity information in a knowledge data store for future analysis and comparison by the feedback processor 170, the reconfiguration module 180, the resource allocation manager 150 and/or the program complexity analysis module 120.

The program complexity analysis module 120 may analyze operations performed by one or more programs 144 to be processed by the cluster computing system 110 and may determine a plurality of complexity parameters that characterize the operation complexity of the program. For example, the program complexity analysis module 120 may determine a computational weighting parameter corresponding to a number of computation intensive operations to be performed in the program (e.g., a map operation, a filter operation, a sample operation, an intersection operation, a shuffle operation, and the like). Additionally, the program complexity analysis module 120 may determine a worker node weighting parameter corresponding to operations that may require data to be obtained from a different source or file (e.g., a load from file operation, a union operation, a join operation, a distinct operation, a join operation, an aggregate operation, and the like) and/or may require multiple worker nodes to perform. Other operational complexity parameters may include a total worker memory weight parameter corresponding to a size of one or more input files and/or a data source file and may be divided between the different worker nodes, a management node memory parameter corresponding to a sum of all data source file sizes because the management node is responsible for aggregating data from all worker nodes, a memory access parameter corresponding to a number of times that memory (e.g., random access memory (RAM)) is accessed and has the fastest execution time of all data access methods, a disk access parameter corresponding to a number of times the program access a disk to load a file or during other operations, a network access parameter corresponding to a number of times data access is performed through a network connection, which is the slowest data access method. In some cases, the program complexity analysis module 120 may analyze one or more additional parameters, such as those associated with operation of the cluster computing framework and including, for example, a distance parameter corresponding to location differences between nodes, a delay latency parameter, a time to run latency parameter, and the like.

In some cases, an intelligent data partitioning engine (e.g., a smart data partitioner 250 of FIG. 2) may determine a data allocation or partitioning scheme that may work in conjunction with the program complexity analysis module 120 and/or may work in addition to the program complexity analysis module 120 to determine a data partitioning scheme for the cloud computing system, as discussed below.

In some cases, the program complexity analysis module 120 may parse an executable script of the program 144 to determine operations being called, data accessed from RAM, data accessed from a disk, data access and/or communication via a network, and the like. For example, the program complexity analysis module 120 pay include a preprocessor module (not shown) to parse the program 144 before further complexity analysis by the operations complexity module 128 and the I/O complexity module perform an analysis of the parsed operations. In some cases, the complexity analysis may include a static analysis based on one or more operations in the program. In some cases, weightings used in performing the analysis may need to be trained, such as by using a supervised machine learning algorithm (e.g., logistic regression, and the like), an unsupervised machine learning algorithm (e.g., an apriori algorithm, and the like), a decision tree algorithm (e.g., a conditional decision tree, and the like), a Bayesian machine learning algorithm (e.g., Naïve Bayes algorithm, a Bayesian network, and the like), a neural network (e.g., stochastic gradient descent, back-propagation, and the like), and or other machine learning algorithms. In an illustrative example, an administrator may initialize the tuning on a first use of the program complexity analysis module 120 by scanning the executable code and providing an initial weighting set including an initial weighting value associated with each parameter discussed above. Based on feedback from the system after processing a batch of input programs, the program complexity analysis module 120 may modify the weightings based on machine learning algorithm analysis of weightings associated with particular operations and/or data access types and adjusting the weightings based on the feedback. For example, an operation may be associated with a high complexity weighting factor or multiplier (e.g., 0.8), but an analysis of the data logs from the cluster computing system 110 following execution may find that the operations executed faster than expected. Based on this feedback, the weighting value may be adjusted to a lower value (e.g., 0.7) based at least upon the execution time, where the new weighting will be applied in the next analysis cycle.

The resource allocation manager 150 may analyze operation complexity information (e.g., graphs, parameters, and the like) and I/O complexity information (e.g., graphs, parameters, and the like) along with information stored in the knowledge data store 190, such as operation complexity information, I/O complexity information stored with respect to previous program execution operation by the cluster computing framework, cluster computing operation feedback information gathered and analyzed by the feedback processor 170, cluster computing configuration parameters set by the reconfiguration module 180 based on previous operation of the cluster computing framework, cluster computing system resource parameters such as those communicated by the cluster computing framework (e.g., by the resource manager 160 of the cluster computing framework) and the like. For example, the program complexity analysis module 120 may communicate operation complexity information and I/O complexity information corresponding to each program 144 of the plurality of programs 142 in the input queue. The resource allocation manager may further receive cluster computing system status information from the resource manager 160 and corresponding to the current operational state of the cluster computing framework. Based on this information, the resource allocation manager 150 may allocate cluster computing resources of the cluster computing system 110 to optimize execution of the programs to, for example, execute an identified high priority program in a timely manner, assign worker nodes and processors to reduce redundancies in node assignments and/or prevent resource shortfalls, to reduce memory usage requirements and assign memory resources to reduce latencies caused by data access limitations, to reduce latencies caused by program switching and interruptions by higher priority jobs, and the like. For example, the resource allocation manager may determine whether sufficient processing resources (e.g., nodes, memory, network bandwidth, processor availability, and the like) is available to allow all programs to be executed in parallel. If so, the resource allocation manager 150 may assign resources based on the I/O and operation complexity information, system parameters and historical information stored in the knowledge base corresponding to historical program processing runs by the cluster computing framework. If not, and based on this information, the resource allocation manager may identify a program processing scheme for the plurality of programs 142 to optimized use of the cluster computing framework resources, such as by allocating enough memory for processing without over committing memory resources in a way that adversely affects cluster computing operation, assigning worker nodes and processor cores such that nodes wait time and latency times are reduced, and the like. For example, processing schemes may include processing a highest complexity program first, processing the programs as they appear in the queue, processing a highest priority program first, and the like. In some cases, the resource allocation manager 150 may process all programs in the queue based on a same scheme or may group programs where each group may be processed in a different manner. For example, an input queue may include 7 programs, where 2 programs are high priority and the remaining 5 are low priority. The resource allocation manager 150 may then assign cluster computing resources and specify that the 2 high priority programs operate using a highest complexity first scheme, while the 5 remaining programs be processed in a first come, first served scheme, either after the higher priority programs complete or in parallel operation depending on available resource parameters and historical information in the knowledge data store.

In an illustrative example, the resource allocation manager 150 may assign a weight to each program based on the I/O complexity information and/or the Operation complexity information. Additionally, the resource allocation manager 150 may assign a multiplier to each program corresponding to an indicated priority of the job. For example, a program execution weight ($PE_{weight}$) may be assigned to each program using the formula $PE_{weight}=P(I/OC_{weight}+OC_{weight})$, where P is a priority multiplier, $OC_{weight}$ is an operation complexity weighting, and $I/OC_{weight}$ is an I/O complexity weighting.

As mentioned, the runtime monitor 130 may be configured to monitor both the input queue 140 and feedback received from the cluster computing system 110. In some cases, the runtime monitor 130 may monitor runtime parameters of the cluster computing system (e.g., operation status parameters, program execution status parameters, and the like). In some cases, the runtime monitor 130 may monitor creation of feedback logs to identify a completion of program operation and/or batch operation of the cluster computing system 110. The runtime monitor may store captured parameter information, parse program logs, or otherwise aggregate runtime data corresponding to a program batch execution run. This information may be associated with the I/O complexity information and operation complexity graphs produced for the program batch and all information may be stored in the knowledge data store 190 for use by the resource allocation manager and/or the reconfiguration module 180.

The reconfiguration module 180 may analyze the feedback information captured by the runtime monitor 130 and associated with the I/O complexity information and operation complexity information. Based on this analysis, the reconfiguration module may update parameters used by the resource allocation manager 150 and the program complexity analysis module 120. For example, the reconfiguration module 180 may process one or more machine learning algorithms to improve weightings assigned to I/O complexity parameters and/or operation complexity parameters. Additionally, the reconfiguration module 180 may process one or more machine learning algorithms to improve a weighting associated with each of the I/O complexity parameters and/or the operation complexity parameters. In some cases, the reconfiguration module 180 may associate a system parameter to different values of the I/O complexity parameters and/or the operation complexity parameters, such as by associating a first weighting for operations scheduled or predicted to occur during a time having historically high network traffic conditions and a second weighting for operations schedule or predicted to occur during a time having historically low network traffic conditions, and the like. The reconfiguration module 180 may monitor operation and/or data input to each of the runtime monitor 130, the program complexity analysis module 120, the resource allocation manager 150, the resource manager 160, and the feedback processor 170. Further, the reconfiguration module 180 may communicate updated information to each of the runtime monitor 130, the program complexity analysis module 120, the resource allocation manager 150, the resource manager 160, and the feedback processor 170 at set times, continuously, and/or may update corresponding entries in the knowledge data store 190 for use by the respective system components as needed.

Figure 2:
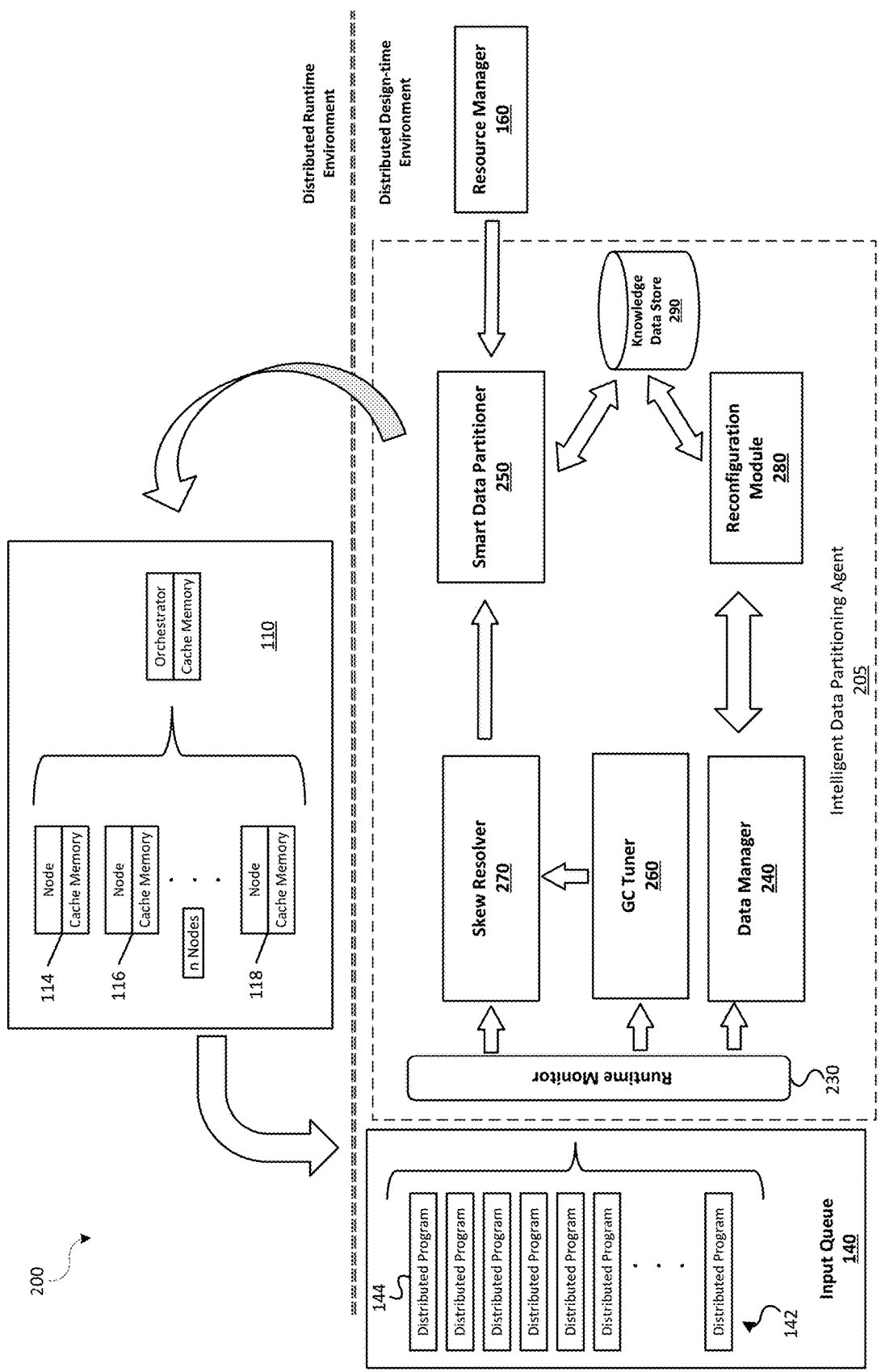
FIG. 2 shows an illustrative cluster computing environment for intelligent data partitioning for a cluster computing environment in accordance with one or more aspects described herein.

FIG. 2 shows an illustrative cluster computing environment 200 for intelligent data partitioning for a cluster computing environment in accordance with one or more aspects described herein. The illustrative cluster computing environment 200 may include the plurality of computing devices in the cluster computing system 110 (e.g., workstations, servers, and the like) configured in a distributed runtime environment, including a plurality of nodes (e.g., workers, executors, and the like), such as the node 114, the node 116, and the node 118, and the orchestrator 112 (e.g., the main node). Additionally, the illustrative cluster computing environment 200 may also include a distributed design time environment including an intelligent data partitioning agent 205 communicatively coupled to the input queue 140 and a resource manager 160 for the cluster computing framework. The illustrative intelligent data partitioning agent 205 may include a runtime monitor 230, a smart data partitioner 250, a garbage collection tuner 260, a skew resolver 270, a data manager 240, a reconfiguration module 280, and a knowledge data store 290.

In a distributed computing environment executing a distributed program, a key goal is to execute the program efficiently by splitting the data into partitions in a precise way to increase parallelism of the overall system. Many distributed computing frameworks may offer the flexibility to define partitions. However, determining the correct partitions is difficult and requires specialized skills to do so. Additional problems with distributed data used in distributed computing environments include data skew and inefficient garbage collection. Data skew may be observed when data is unevenly distributed. In an illustrative example, for columnar data, data skew may exist for each column. Symptoms of skewed data may include uneven distribution of data when values of a dataset are grouped based on range and/or category, when the values are not randomly and equally spread across all pointers, when data values are very highly concentrated at one point, and the like. Data skew may occur when performing any types of aggregations and/or shuffle heavy operations, such as counts, sums, joins, group by and the like, particularly when the underlying data is unevenly distributed. In a distributed system, such transformation executions would cause the data values to be grouped based on a hashing and modulo logic, or other such algorithms. In some cases, such as for joins or aggregations, a distributed computing system may co-locate records associated with a particular key within a partition. Similarly, records of a particular key may be associated with a single partition. If a partition becomes vey large, data skew may occur. The skew resolver 270 may operate to identify and resolve data skews. While skew may be resolved in relational databases, distributed computing environments require different processes.

Another problem encountered when running programs in distributed environments is garbage collection. Often, the garbage collection mechanisms and/or memory management operations of a distributed computing environment 200 may be reliant upon an underlying programming language, such as Java Virtual Memory (JVM). Symptoms of excessive garbage collection may include slow operation times, execution timeouts, excessive runtimes, and the like.

The intelligent data partitioning agent 205 may solve the above-mentioned problems through the smart data partitioner 250 that may process one or more machine learning algorithms and information stored in the knowledge data store 290 to intelligently and automatically determine a number of partitions to ensure efficient program execution. Similarly, the skew resolver 270 may analyze data from the knowledge data store 290 to identify potential data skews proactively and/or reactively based on information received from the feedback monitor following program execution.

As discussed with respect to FIG. 1, based on the distributed program(s) input into the system via the input queue 140, the resource manager 160 may identify resources available for program execution (e.g., a number of cores, input data size, executor memory, I/O complexity, and the like), as well as analyzing the distributed program to determine an optimal number of resources, node memory configuration(s) needed for program execution, and orchestrator node memory requirements such as by determining a complexity of the distributed program. Once the system resources are allocated by the resource manager 160, the smart data partitioner 250 may analyze the code of the distributed program to identify how the data should be partitioned, such as through one or more predictive algorithms processing information stored in the knowledge data store 290. For example, the smart data partitioner 250 may, for example, identify a size and/or resources associated with one or more input partitions, one or more shuffle partitions, and one or more output partitions. Other partitions may also be determined without departing from the scope of the disclosure. Once requirements for the one or more input partitions, one or more shuffle partitions, and/or one or more output partitions are identified, the smart data partitioner 250 may optimally calculate each partition and may then provide the data partition information to the distributed environment for use during execution.

In some cases, the runtime monitor 230 of the intelligent data partitioning agent 205 may monitor inputs to the cluster computing system 110 (e.g., the input queue 140) and outputs of the cluster computing system 110 such as, for example, execution logs providing information regarding program execution efficiency and computing resource status. For example, the runtime monitor 230 may monitor the input queue 140 to determine whether a batch of programs have been queued for processing. In some cases, the runtime monitor 230 may identify that a batch of programs 142 has been loaded in the input queue 140 and then trigger the smart data partitioner 250 to parse each program 142 of one or more of programs 144 of the batch, and process such information, along with information received from the resource manager 160 and/or information stored in the knowledge data store 290, to determine an optimal data partitioning scheme for use when processing the distributed programs in the queue. In some cases, programs may be loaded in the input queue, as individual programs or batches of programs, until a threshold number of programs has been reached before triggering the smart data partitioner 250 to parse each program 142 of one or more of programs 144 in the input queue. Additionally, the runtime monitor 130 may monitor execution logs and other execution status information output by the cluster computing system 110 following completed execution of the programs in a processed batch, as discussed in more detail below.

In some cases, the runtime monitor 130 may monitor creation of feedback logs to identify a completion of program operation and/or batch operation of the cluster computing system 110. The runtime monitor 130 may store captured parameter information, parse program logs, or otherwise aggregate runtime data corresponding to a program batch execution run. This information may be associated with data skew and/or garbage collection operations and all information may be stored in the knowledge data store 190 for use by garbage collection tuner 260, the skew resolver 270, the resource allocation manager 150, the data manager 240, and/or the smart data partitioner 250. This information may be analyzed and used by one or more system modules to identify one or more problems occurring with the program execution and/or to resolve any of the identified problems. For example, if a task was long running or if garbage collection operation took more than a threshold amount (e.g., about 10%, about 15% and the like) of processor execution, data skews were identified, and/or the like, an associated module may reconfigure the data allocation and/or partitioning information the next time that job, or a similar job, is run. In general, the runtime monitor 230 may monitor program execution and may provide information corresponding to program execution such that system components can identify better and/or more efficient data partitioning. Such information may be stored in the knowledge data store 190 for future use by the smart data partitioner 250.

In some cases, the smart data partitioner 250 may determine a size of the data partitions, a number of data partitions, and a partition key based on information received from the resource allocation manager 150, information retrieved from the knowledge data store 290 and information from the skew resolver 270 and/or the garbage collection tuner 260. Data partitioning information determined by the smart data partitioner 250 may be stored in the knowledge data store 290 and may be associated with information identifying the associated distributed programs 142, and/or resource information such as a number of cores, an input data size, executor memory availability, I/O complexity, data block size and the like. The data manager 240 may be used to load an input data set into a resilient distributed data (RDD) data set and may cache the RDD. The data manager 240 may also be used to identify a memory requirement for the programs in the input queue 140. The data manager 240 may provide the RDD and/or other data requirements to the reconfiguration module 280 to allow for reconfiguration within the distributed design time environment.

The garbage collection tuner 260 may analyze data received from the runtime monitor 230 to identify one or more issues related to problems caused by garbage collection issues. For example, if a task runtime exceeds a predetermined threshold (e.g., 10%) for garbage collection, the garbage collection tuner 260 may perform one or more garbage collection mitigation operations to clear potential garbage collection problems encountered due to inefficient data partitioning. For example, the garbage collection tuner 260 may provide information to the skew resolver 270 and/or the smart data partitioner 250 to improve garbage collection operations, such as by adjusting heap sizes to avoid memory leaks, improving CPU usage, and the like.

The smart data partitioner 250, as mentioned above, may identify a number and/or a size of multiple partition types, such as input partitions, shuffle partitions, output partitions, and the like. Input partitions may be controlled by block size (e.g., 128 megabytes (MB)). In an illustrative example, if 11 gigabytes (GB) of data is to be read and 96 cores or executors are available to read the data, the distributed computing environment may partition the data into 90 partitions by default. In most cases, such default settings may lead to inefficiencies and the run times may be longer than desired as a result. In some cases, the smart data partitioner 250 may, for a similar example of 11 GB of data with 96 cores, calculate the number of partitions as some multiple of the number of cores, in this case the number of partitions may be some multiple of 96. For example, the smart data partitioner 250 may calculate 192 input partitions (e.g., 2x) or 288 input partitions (3x) to ensure reads operate faster and all of the cores are used. Shuffle partitions may be used by the distributed computing environment for more complex operations, such as join operations or grouping operations (e.g., group on a key) because data utilized in such operations may be distributed over many storage locations and/or partitions. Shuffle partitions must be sized for use in an efficient manner since, for example, a group on key command will group all values associated with a key into a single partition. In some cases, partition size for shuffle partitions may be based on a defined block size (e.g., 100 MB, 128 MB, and the like). If, for example, two data tables are to be joined are of a collective size (e.g., 54 GB), with a block size of 100 MB for simplicity, 540 partitions would be needed with 96 cores. If the command is to be run 5 times, then an ideal partition size may be calculated based on the number of cores to further optimize the number of partitions. In general, based on a particular block size, the smart data partitioner 250 may calculate a number of partitions to be created and then, based on a number of cores, further optimize the number of partitions. Once calculated, the smart data partitioner 250 may submit the shuffle partitions for use. The third type of partition is the output partitions which may, in some cases, be calculated similarly to the number of input partitions, such that while writing the output file, all cores are used efficiently.

The skew resolver 270 may analyze the distributed program(s) 142 and may determine a proactive identification of the skew, such as by identifying and analyzing two tables to be joined or other such operations. When the skew resolver 270 identifies the skew, a value distribution may be analyzed. If the values are uniformly distributed for a particular key, skew may not be found. If, however, a large number of null values are found for any key, then the skew resolver 270 may operate to remedy the skew. For example, the skew resolver 270 may apply a null treatment such as by dividing the data into null variables and non-null variables. The non-null table may then be kept and treated in a non-generic manner, as described below with respect to FIG. 5. In some cases, the skew resolver 270 may analyze information stored in the knowledge data store 290 to identify patterns associated with skew. In this way, the skew resolver may identify potential causes of skew and proactively partition data to avoid such situations.

Figure 3:
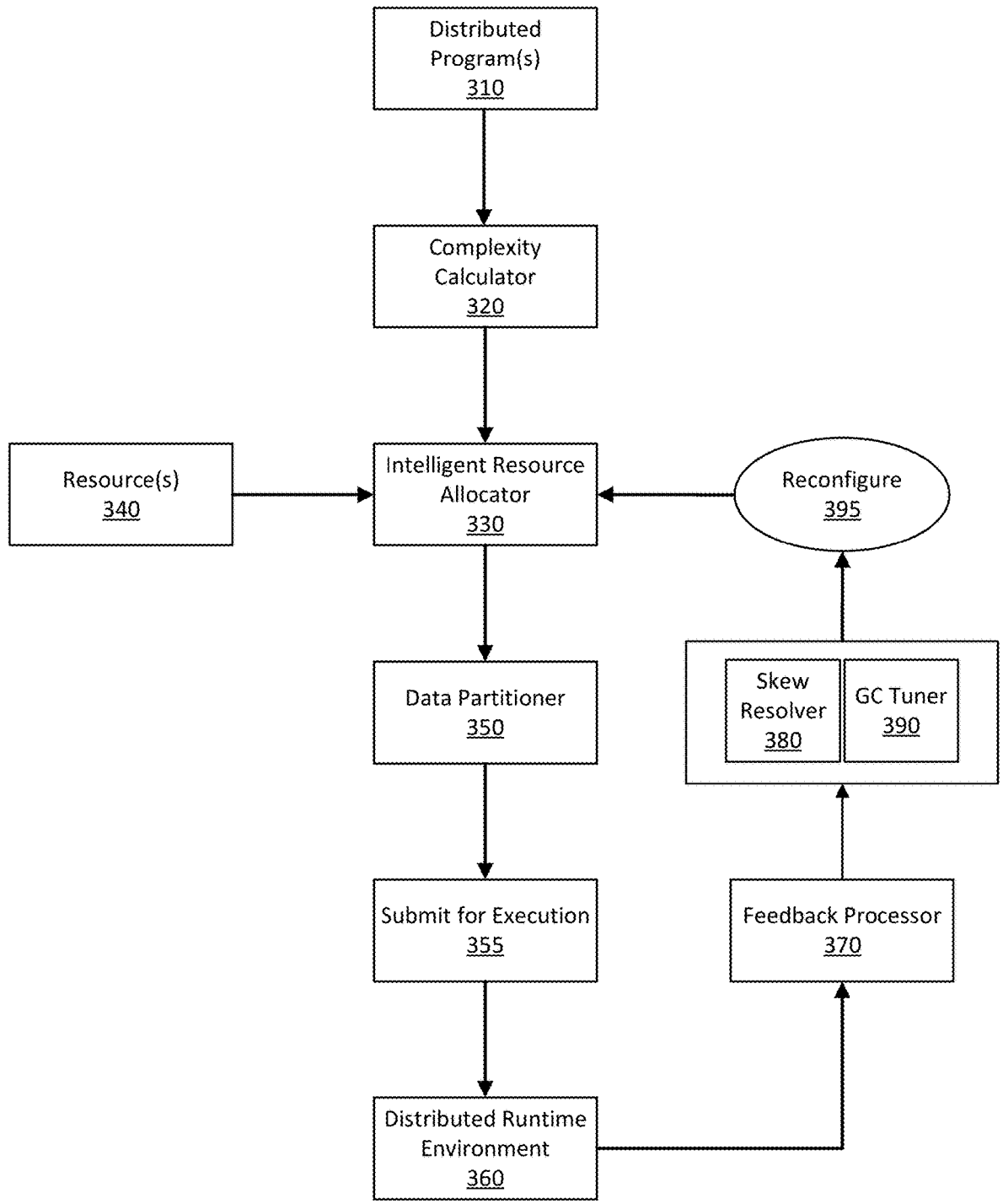
FIG. 3 shows an illustrative high-level operational block diagram in accordance with one or more aspects described herein.

FIG. 3 shows an illustrative high-level operational block diagram in accordance with one or more aspects described herein. In some cases, distributed programs 310 may be queued to be run in a distributed cloud computing environment. The complexity calculator 320 may analyze the distributed programs 310, as discussed above, to determine complexity information associated with the programs and may provide the program complexity information to the intelligent resource allocator 330. The intelligent resource allocator 330 may analyze the program complexity information for each job and computing environment resource information 340 and may allocate resources to optimally process the distributed programs 310. As each job is queued, the jobs are optimized again after a run. The data partitioner 350 may partition the data resources as discussed above and the distributed programs are submitted for execution 355 by the distributed runtime environment 360 based on the resource allocation provided by the intelligent resource allocator 330 and the data partitioning information from the data partitioner 350. After the program run (e.g., job) completes, the feedback processor 370 analyzes log files and the like and may provide information to the skew resolver 380 and/or the garbage collection tuner 390 as needed. The skew resolver 380 analyzes at information corresponding to program performance during operation and, based on that, the skew resolver may modify one or more operating parameters so that that the partitions may be uniformly applied to all of the values. For example, the skew resolver may identify whether a partition may be predicted to have more skew than other partitions. Once complete, data partitioning reconfiguration information 395 may be provided to the intelligent resource allocator 330 for future use when allocating resources and/or data for upcoming jobs.

Figure 4:
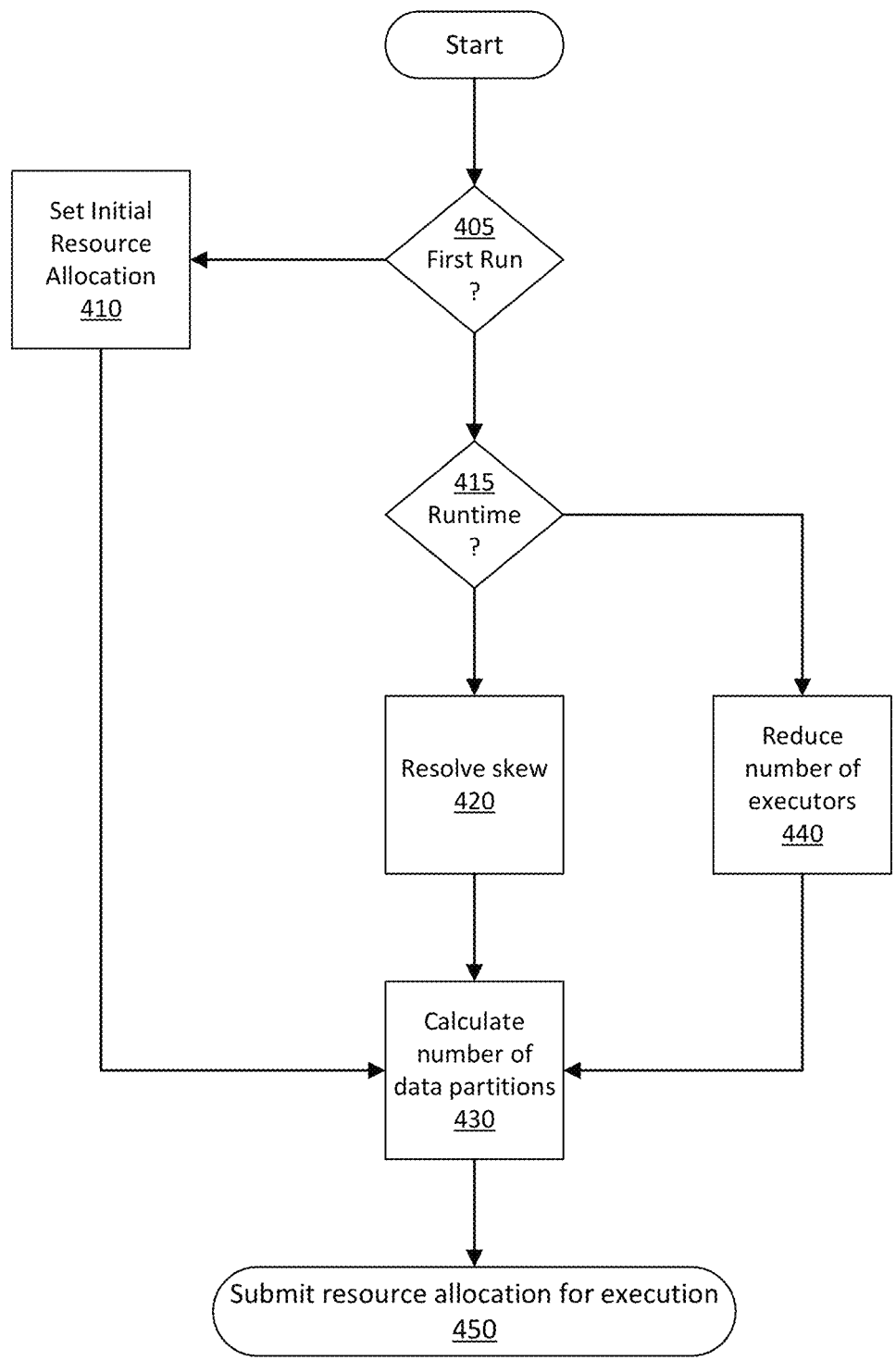
FIG. 4 shows an illustrative block diagram showing operation of an intelligent data partitioning engine in accordance with one or more aspects described herein.

FIG. 4 shows an illustrative block diagram showing operation of an intelligent data partitioning agent 205 in accordance with one or more aspects described herein. At 405 the intelligent resource allocation agent may determine whether distributed programs are to be run as part of an initial run of a job. If so, an initial resource allocation that may be based, at least in part, on information stored in the knowledge data store 290 may be set at 410 and the smart data partitioner 250 may calculate a number of data partitions at 430 for use when processing the distributed programs and submit the resource allocation for execution by the cluster computing system 110 at 450. If, at 405, the job to be processed has been run before then the runtime monitor 230 may compare a runtime of the previous job run, or of multiple job runs, to a threshold at 415. If, at 415, a runtime is greater than a runtime threshold then the skew resolver 270 may analyze the data and resolve any skew, as described with FIG. 5. Once the skew resolver 270 is finished, then the smart data partitioner 250 may calculate the number of data partitions for use when processing the job at 430 and submit the resource allocation for execution at 450. If, at 405, the runtime is below a certain threshold, indicating that too many resources may have bene allocated, the runtime monitor 130 may cause the reconfiguration module 280 to reduce a number of executors allocated for processing the job at 440 and submit the resource allocation for execution at 450.

In an illustrative example, the smart data partitioner 250 may calculate the number of data partitions by first determining a block size between a minimum size (e.g., 100 MB) and a maximum size (e.g., 250 MB). In some cases, the block size may be dependent on the runtime environment of the distributed computing system. In some cases, the block size may be determined based on information stored in the knowledge data store 290, such as information corresponding to efficient processing of similar jobs and/or information corresponding to inefficient processing of similar jobs. The smart data partitioner 250 may process one or more machine learning algorithms when processing the knowledge base information to calculate an optimal block size for a set of programs associated with a job. Once the block size has been determined, the smart data partitioner may process a machine learning algorithm to determine a number of partitions for use when partitioning data processed by the cluster computing system 110. For example, based on a number of cores available in the distributed computing network, the may set a maximum number of partitions where the number of partitions may be limited to a number less than 2 times the number of cores available. In some cases, the number of partitions may be calculated, on a first run, by using a starting block size (e.g., 128 MB) and determining a number of partitions by dividing a total input size (e.g., 5 GB) of the data by the starting block size. On subsequent iterations, based on machine learning algorithms and information stored in the knowledge data store 290, the smart data partitioner 250 may change the block size, such as by adding or subtracting an amount, such as a constant amount (e.g., 10 MB), a percentage amount (e.g., 10%), or by an amount calculated based on a formula or other algorithm (e.g., amount=block size−block size*(processing time/previous runtime). Once the number of partitions is calculated, the smart data partitioner may then determine a multiplier based on a number of available cores, such as by dividing the number of partitions by the number of cores. In some cases, the smart data partitioner may determine a number of partitions by multiplying the number of cores by the multiplier, such as during an initial run of a job. Once determined, the partitioning information may be stored in the knowledge data store 290 for use during processing of the same job or for use in calculating a number of partitions for processing of similar jobs.

Figure 5:
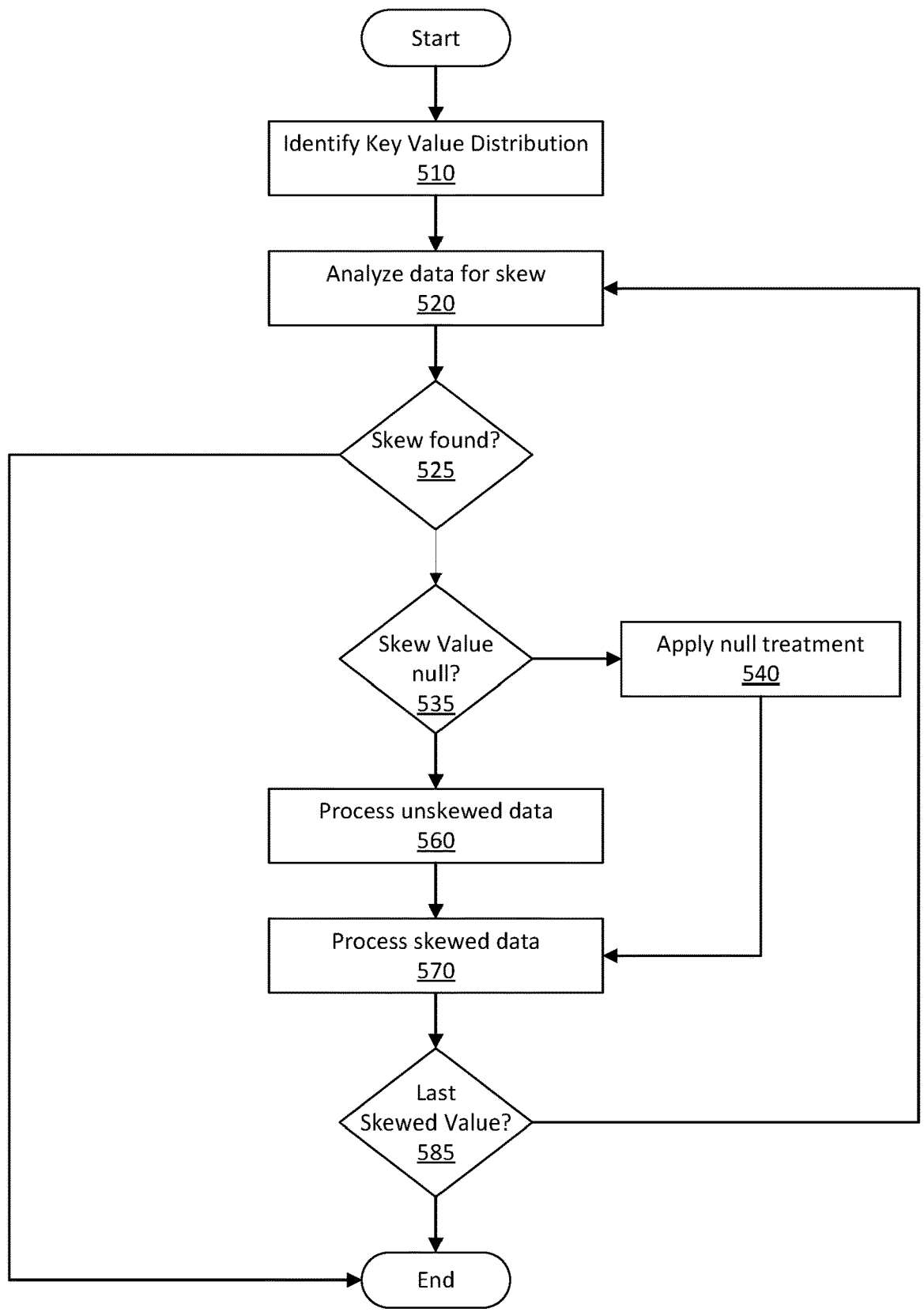
FIG. 5 shows an illustrative block diagram showing operation of a skew resolver with cached memory access in accordance with one or more aspects described herein.

FIG. 5 shows an illustrative block diagram showing operation of a skew resolver 270 with cached memory access in accordance with one or more aspects described herein. At 510, the skew resolver 270, or the runtime monitor 230, may analyze data stored after processing a job to identify a key value distribution and may analyze the data for skew 520. If skew is not found at 525, then the skew resolver 270 or the runtime monitor 230 may end the skew analysis. If, at 525, skew is found the skew values are further analyzed for null values at 535. If, at 535 null values are found, a null treatment may be applied to the data such as by dividing the variables into null variables and non-null variables. Once the null treatment has been applied, the skewed data may be processed at 570. If, at 535, a null value is not found, the unskewed data may be processed at 560 and the skewed data may be processed at 570. For example, at 560, the unskewed data table may be replicated n-times and at 570, the skew resolver 270 may add normally distributed values between 1 and x to the skewed table data. At 585, the skew resolver 270 may determine whether a last skewed value had been processed. If so, the skew resolver 270 ends the processing of the data for the run and stores results in the knowledge data store 290 for use when processing future runs of the same jobs and/or for determining data partitioning requirements of the same or similar jobs. If, at 585, additional skewed values are remaining, the skew resolver 270 analyzes the table data at 520.

Figure 6:
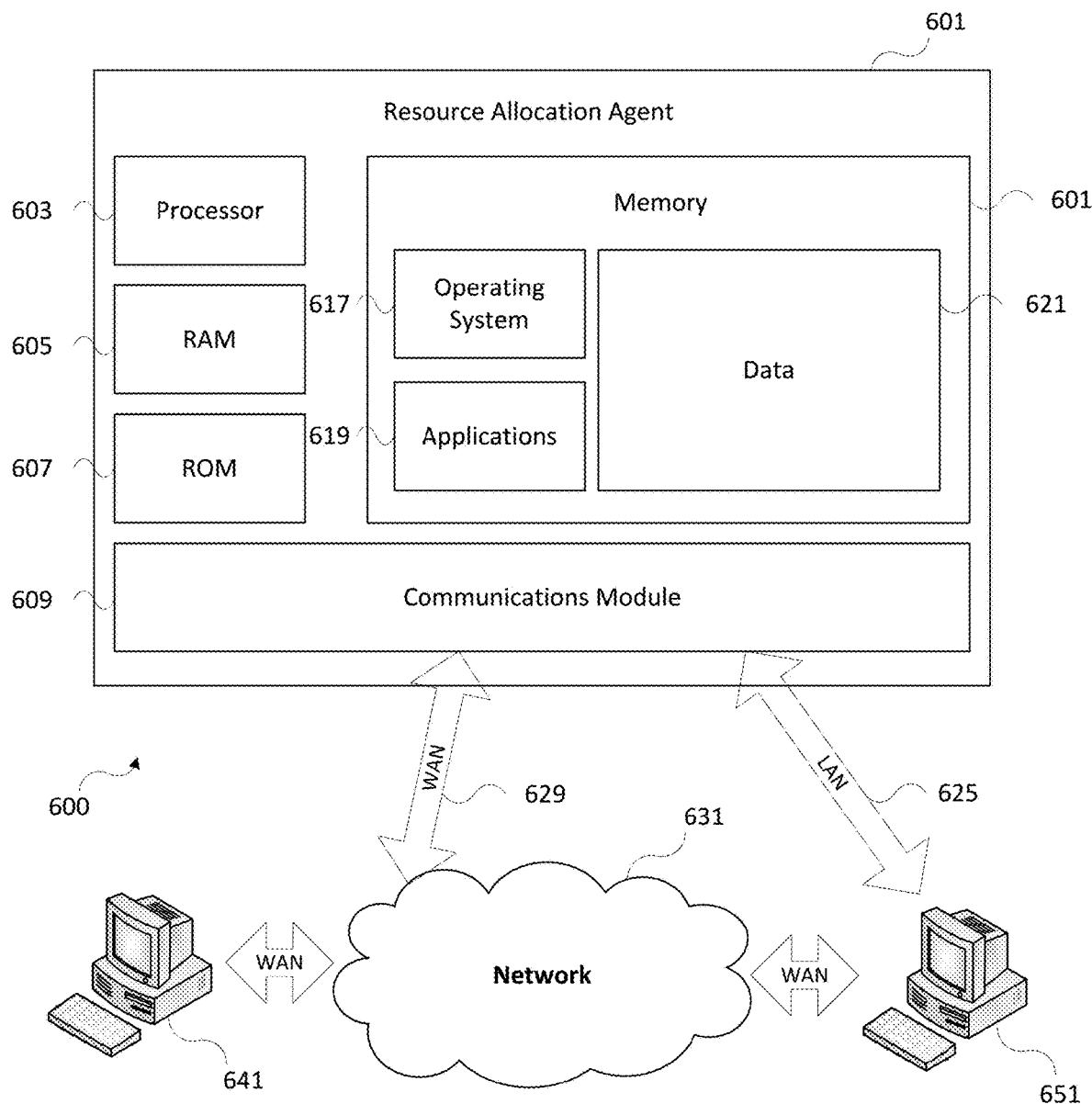
FIG. 6 shows an illustrative operation complexity graph operating environment in which various aspects of the disclosure may be implemented in accordance with one or more aspects described herein.

FIG. 6 shows an illustrative operating environment in which various aspects of the present disclosure may be implemented in accordance with one or more example embodiments. Referring to FIG. 6, a computing system environment 600 may be used according to one or more illustrative embodiments. The computing system environment 600 is only one example of a suitable computing environment and is not intended to suggest any limitation as to the scope of use or functionality contained in the disclosure. The computing system environment 600 should not be interpreted as having any dependency or requirement relating to any one or combination of components shown in the illustrative computing system environment 600.

The computing system environment 600 may include an illustrative resource allocation agent 601 having a processor 603 for controlling overall operation of the resource allocation agent 601 and its associated components, including a Random Access Memory (RAM) 605, a Read-Only Memory (ROM) 607, a communications module 609, and a memory 615. The resource allocation agent 601 may include a variety of computer readable media. Computer readable media may be any available media that may be accessed by the resource allocation agent 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the resource allocation agent 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 603 of the resource allocation agent 601. Such a processor may execute computer-executable instructions stored on a computer-readable medium.

Software may be stored within the memory 615 and/or other digital storage to provide instructions to the processor 603 for enabling the resource allocation agent 601 to perform various functions as discussed herein. For example, the memory 615 may store software used by the resource allocation agent 601, such as an operating system 617, one or more application programs 619, and/or an associated database 621. In addition, some or all of the computer executable instructions for the resource allocation agent 601 may be embodied in hardware or firmware. Although not shown, the RAM 605 may include one or more applications representing the application data stored in the RAM 605 while the resource allocation agent 601 is on and corresponding software applications (e.g., software tasks) are running on the resource allocation agent 601.

The communications module 609 may include a microphone, a keypad, a touch screen, and/or a stylus through which a user of the resource allocation agent 601 may provide input, and may include one or more of a speaker for providing audio output and a video display device for providing textual, audiovisual and/or graphical output. The computing system environment 600 may also include optical scanners (not shown).

The resource allocation agent 601 may operate in a networked environment supporting connections to one or more remote computing devices, such as the computing devices 641 and 651. The computing devices 641 and 651 may be personal computing devices or servers that include any or all of the elements described above relative to the resource allocation agent 601.

The network connections depicted in FIG. 6 may include a Local Area Network (LAN) 625 and/or a Wide Area Network (WAN) 629, as well as other networks. When used in a LAN networking environment, the resource allocation agent 601 may be connected to the LAN 625 through a network interface or adapter in the communications module 609. When used in a WAN networking environment, the resource allocation agent 601 may include a modem in the communications module 609 or other means for establishing communications over the WAN 629, such as a network 631 (e.g., public network, private network, Internet, intranet, and the like). The network connections shown are illustrative and other means of establishing a communications link between the computing devices may be used. Various well-known protocols such as Transmission Control Protocol/ Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
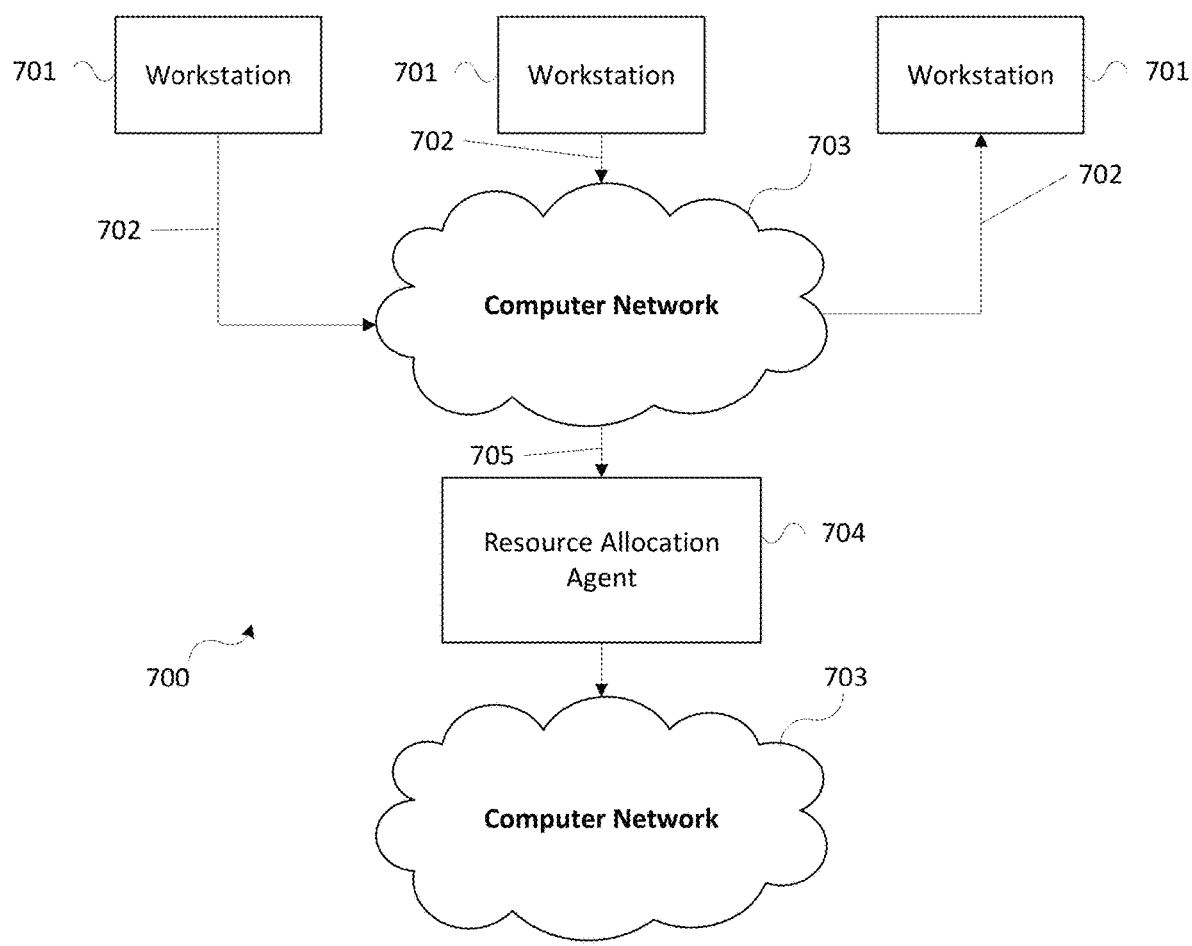
FIG. 7 shows an illustrative block diagram of workstations and servers that may be used to implement the processes and functions of certain aspects of the present disclosure in accordance with one or more aspects described herein.

FIG. 7 shows an illustrative block diagram of workstations and servers that may be used to implement the processes and functions of certain aspects of the present disclosure in accordance with one or more example embodiments. For example, an illustrative system 700 may be used for implementing illustrative embodiments according to the present disclosure. As illustrated, the system 700 may include one or more workstation computers 701. The workstation 701 may be, for example, a desktop computer, a smartphone, a wireless device, a tablet computer, a laptop computer, and the like, configured to perform various processes described herein. The workstations 701 may be local or remote, and may be connected by one of the communications links 702 to a computer network 703 that is linked via the communications link 705 to the resource allocation agent 704. In the system 700, the resource allocation agent 704 may be a server, processor, computer, or data processing device, or combination of the same, configured to perform the functions and/or processes described herein. The resource allocation agent 704 may be used to receive check images and associated data and/or validation scores, retrieve user profile, evaluate the check image compared to the user profile, identify matching or non-matching elements, generate user interfaces, and the like.

The computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 702 and 705 may be communications links suitable for communicating between the workstations 701 and the resource allocation agent 704, such as network links, dial-up links, wireless links, hardwired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing system, comprising:
a distributed computing system comprising a cluster computing framework; and
a resource allocation computing device comprising:
a processor; and memory storing computer-readable instructions that, when executed by the processor, cause the resource allocation computing device to:
    monitor an input queue;
    calculate, by an intelligent data partitioning engine, data requirements for processing of one or more program files in the input queue;
    determine, based on a block size and available processing resources of a plurality of nodes of the distributed computing system, a number of data partitions;
    trigger execution of the one or more program files by the cluster computing framework of the distributed computing system via a network communication, wherein the cluster computing framework is configured based on the block size and the number of data partitions;
    update the data requirements for processing of the one or more program files based on feedback from the cluster computing framework corresponding to one or more previous processing runs of the one or more program files; and
    update the data requirements for processing of the one or more program files in the input queue based on a block size modified based on feedback from the cluster computing framework.

2. The computing system of claim 1, wherein the instructions, when executed, cause the resource allocation computing device to:
    analyze the feedback from the cluster computing framework corresponding to one or more previous processing runs of the one or more program files; and
    resolve, based on the analyzed feedback, skew identified in processed data returned from the cluster computing framework.

3. The computing system of claim 1, wherein the instructions, when executed, cause the resource allocation computing device to:
    analyze the feedback from the cluster computing framework corresponding to one or more previous processing runs of the one or more program files; and
    determine, based on the analyzed feedback, revised data partitioning parameter values to improve garbage collection efficiency of the cluster computing framework.

4. The computing system of claim 1, wherein the instructions, when executed, cause the resource allocation computing device to:
    analyze the feedback from the cluster computing framework corresponding to one or more previous processing runs of the one or more program files;
    determine, based on the analyzed feedback, runtime information associated with completion of each processed task of the one or more program files; and
    recalculate, based on the runtime information, the number of data partitions.

5. The computing system of claim 1, wherein the instructions, when executed, cause the resource allocation computing device to:
    analyze the feedback from the cluster computing framework corresponding to one or more previous processing runs of the one or more program files;
    determine, based on the analyzed feedback, runtime information associated with completion of each processed task of the one or more program files; and
    reduce, based on the runtime information, a number of executors processed by the cluster computing framework.

6. A method comprising:
    monitoring, by a resource monitor, an input queue of a cluster computing framework processed by a distributed computing system;
    calculating, by a computing device, data requirements for processing of one or more program files in the input queue;
    determining, based on a block size and available processing resources of a plurality of nodes of the distributed computing system, a number of data partitions;
    triggering execution of the one or more program files by the cluster computing framework of the distributed computing system via a network communication, wherein the cluster computing framework is configured based on the block size and the number of data partitions;
    updating the data requirements for processing of the one or more program files based on feedback from the cluster computing framework corresponding to one or more previous processing runs of the one or more program files; and
    updating the data requirements for processing of the one or more program files in the input queue based on a block size modified based on feedback from the cluster computing framework.

7. The method of claim 6, comprising:
    analyzing the feedback from the cluster computing framework corresponding to one or more previous processing runs of the one or more program files; and
    resolving, based on the analyzed feedback, skew identified in processed data returned from the cluster computing framework.

8. The method of claim 6, further comprising:
    analyzing the feedback from the cluster computing framework corresponding to one or more previous processing runs of the one or more program files; and
    determining, based on the analyzed feedback, revised data partitioning parameter values to improve garbage collection efficiency of the cluster computing framework.

9. The method of claim 6, further comprising:
    analyzing the feedback from the cluster computing framework corresponding to one or more previous processing runs of the one or more program files;
    determining, based on the analyzed feedback, runtime information associated with completion of each processed task of the one or more program files; and
    recalculating, based on the runtime information, the number of data partitions.

10. The method of claim 6, further comprising:
    analyzing the feedback from the cluster computing framework corresponding to one or more previous processing runs of the one or more program files;
    determining, based on the analyzed feedback, runtime information associated with completion of each processed task of the one or more program files; and
    reducing, based on the runtime information, a number of executors processed by the cluster computing framework.

11. A resource allocation computing device comprising:
    a processor; and
    memory storing computer-readable instructions that, when executed by the processor, cause the resource allocation computing device to:
        monitor an input queue;
        calculate data requirements for processing of one or more program files in the input queue;

determine, based on a block size and available processing resources of a plurality of nodes of a distributed computing system, a number of data partitions;

trigger execution of the one or more program files by a cluster computing framework of the distributed computing system via a network communication, wherein the cluster computing framework processed by the distributed computing system is configured based on the block size and the number of data partitions; and update the data requirements for processing of the one or more program files based on feedback from the cluster computing framework corresponding to one or more previous processing runs of the one or more program files; and update the data requirements for processing of the one or more program files in the input queue based on a block size modified based on feedback from the cluster computing framework.

12. The resource allocation computing device of claim 11, wherein the instructions, when executed, cause the resource allocation computing device to:

analyze the feedback from the cluster computing framework corresponding to one or more previous processing runs of the one or more program files; and resolve, based on the analyzed feedback, skew identified in processed data returned from the cluster computing framework.

13. The resource allocation computing device of claim 11, wherein the instructions, when executed, cause the resource allocation computing device to:

analyze the feedback from the cluster computing framework corresponding to one or more previous processing runs of the one or more program files; and determine, based on the analyzed feedback, revised data partitioning parameter values to improve garbage collection efficiency of the cluster computing framework.

14. The resource allocation computing device of claim 11, wherein the instructions, when executed, cause the resource allocation computing device to:

analyze the feedback from the cluster computing framework corresponding to one or more previous processing runs of the one or more program files;

determine, based on the analyzed feedback, runtime information associated with completion of each processed task of the one or more program files; and recalculate, based on the runtime information, the number of data partitions.

15. The resource allocation computing device of claim 11, wherein the instructions, when executed, cause the resource allocation computing device to:

analyze the feedback from the cluster computing framework corresponding to one or more previous processing runs of the one or more program files;

determine, based on the analyzed feedback, runtime information associated with completion of each processed task of the one or more program files; and reduce, based on the runtime information, a number of executors processed by the cluster computing framework.

* * * * *